United States Patent
Kuncham

(10) Patent No.: US 11,695,442 B2
(45) Date of Patent: *Jul. 4, 2023

(54) TRANSCEIVER WITH TIME DOMAIN IQMM ESTIMATION

(71) Applicant: TEXAS INSTRUMENTS INCORPORATED, Dallas, TX (US)

(72) Inventor: Sucheth S. Kuncham, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,400

(22) Filed: Nov. 29, 2021

(65) Prior Publication Data

US 2023/0170925 A1    Jun. 1, 2023

(51) Int. Cl.
*H04B 1/30* (2006.01)
*H04B 1/44* (2006.01)
*H04B 1/18* (2006.01)

(52) U.S. Cl.
CPC .............. *H04B 1/30* (2013.01); *H04B 1/18* (2013.01); *H04B 1/44* (2013.01); *H04B 2001/305* (2013.01); *H04B 2001/307* (2013.01)

(58) Field of Classification Search
CPC ... H04B 1/30; H04B 1/18; H04B 1/44; H04B 2001/305; H04B 2001/307
See application file for complete search history.

(56) References Cited

U.S. PATENT DOCUMENTS

| | | | |
|---|---|---|---|
| 2019/0036749 A1* | 1/2019 | Erez | H04L 27/364 |
| 2020/0169434 A1* | 5/2020 | Tangudu | H04B 1/525 |
| 2020/0177417 A1* | 6/2020 | Tangudu | H04B 1/30 |

* cited by examiner

*Primary Examiner* — Nguyen T Vo

(74) *Attorney, Agent, or Firm* — Krista Y. Chan; Frank D. Cimino

(57) ABSTRACT

A receiver includes a switch network, a mixer, and an IQ mismatch (IQMM) estimation circuit. The switch network is adapted to be coupled to an output of a transmitter. The switch network is configured to selectably swap complementary signals of a differential pair. The mixer is coupled to the switch network and is configured to down-convert an output signal of the switch network. The IQ IQMM estimation circuit is coupled to the mixer, and is configured to estimate an IQMM of the transmitter based on an output signal of the mixer.

14 Claims, 4 Drawing Sheets

TRANSCEIVER WITH TIME DOMAIN IQMM ESTIMATION

BACKGROUND

Wireless communication devices are widely used to provide communication of voice signals, multimedia signals, data signals, and other information. In some wireless communication devices, a digital baseband circuit provides a data stream of complex baseband data to a transmitter. The transmitted baseband data may be carried on an orthogonal transmitter signal represented by a real (in-phase (I)) component and an imaginary (quadrature (Q)) component. In the transmitter, the in-phase component and the quadrature component of the transmitter signal are processed along parallel in-phase and quadrature component circuit paths. The signal processing provided in the in-phase and quadrature paths may include digital-to-analog conversion, mixing, filtering, power amplification, etc. The in-phase and quadrature signals are modulated to produce an analog radio frequency (RF) signal that is transmitted. Ideally, the in-phase and quadrature components are processed along parallel circuit paths in the transmitter where the circuit elements along one path are perfectly identical, or "matched", with corresponding circuit elements along the other parallel path.

SUMMARY

In one example, a transceiver circuit includes a transmitter and a receiver. The transmitter includes an IQ mismatch (IQMM) correction circuit and a power amplifier. The power amplifier includes an input and an output. The input is coupled to the IQMM correction circuit. The receiver is coupled to the output of the power amplifier. The receiver includes a switch network, a mixer, and an IQMM estimation circuit. The switch network is coupled to the output of the power amplifier. The switch network includes a first input, a second input, a first output, a second output, a first switch, a second switch, a third switch, and a fourth switch. The first switch is coupled between the first input and the first output. The second switch is coupled between the first input and the second output. The third switch is coupled between the second input and the second output. The fourth switch is coupled between the second input and the first output. The mixer is coupled to the first output and the second output of the switch network. The IQMM estimation circuit is coupled to the mixer and the IQMM correction circuit.

In another example, a receiver includes a switch network, a mixer, and an IQMM estimation circuit. The switch network is adapted to be coupled to an output of a transmitter. The switch network is configured to selectably swap complementary signals of a differential pair. The mixer is coupled to the switch network and is configured to down-convert an output signal of the switch network. The IQMM estimation circuit is coupled to the mixer, and is configured to estimate an IQMM of the transmitter based on an output signal of the mixer.

In a further example, a method for IQMM estimation includes computing a first IQMM estimate for a transmitter and a receiver based on a symmetric down-conversion of a first received signal, and computing a second IQMM estimate for the transmitter and the receiver based on an asymmetric down-conversion of a second received signal. A transmitter IQMM estimate is computed based on the first IQMM estimate and the second IQMM estimate. The transmitter IQMM estimate is applied to modify a signal to be transmitted by the transmitter.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

In communication systems that are compliant with the IEEE802.11 standards, orthogonal frequency division multiplexed (OFDM) subcarriers are modulated with quadrature amplitude modulation (QAM) for transmission. QAM employs in-phase (I) signals and quadrature (Q) signals and associated parallel processing paths. The quality of transmitted signal is assessed using a parameter called error vector magnitude (EVM). EVM encompasses a variety of possible transmitter impairments including radio frequency (RF) non-linearity, IQ mismatch (IQMM), phase noise (IPN).

IQMM is the difference (mismatch) of gain or phase in the parallel in-phase and quadrature channel processing paths. To meet an EVM target of −28 dB, the signal-to-nose ratio (SNR) target for IQMM is 45 dB. To provide compensation for IQMM, the amount of IQMM to be compensated is estimated in an auxiliary receiver coupled to the transmitter. Measurement of IQMM is subject to a variety of issues and limitations. In some examples, to facilitate low power operation, IQMM is measured in the time domain. Because the frequency band used to implement IEEE 802.11 based communication is shared by other wireless technologies (e.g., BLUETOOTH, ZIGBEE, etc.), IQMM estimation may be performed using ODFM packets, rather than continuous wave tones. The auxiliary receiver coupled to the output of the transmitter provides down-conversion of transmitted signal for measurement of transmitter IQMM. However, the auxiliary receiver adds its own IQMM to the received signal, and measurement of transmitter IQMM should be immune to frequency dependent IQMM (IQFD) of the auxiliary receiver.

In examples of the transceiver (transmitter and associated auxiliary receiver) described herein, time domain IQMM estimation is performed using an indirect adaptive algorithm. Symmetric and asymmetric down-conversion are used to separate transmitter IQMM and auxiliary receiver IQMM from transmitter-auxiliary receiver loop IQMM. Asymmetric down-conversion (conjugate generation) is performed by swapping the differential lines driving the mixer of the auxiliary receiver (i.e., inverting one of the I or Q signal at the mixer input). The IQMM estimation is immune to auxiliary receiver IQMM and IQFD. The estimation employs two iterations. The first iteration estimates transmitter-auxiliary receiver loop IQMM using normal (symmetric) down-conversion (+I and +Q). The second iteration estimates transmitter-auxiliary receiver loop IQMM using asymmetric down-conversion (+I and −Q, or −I and +Q), in which the auxiliary receiver input is the conjugate of the original signal and the resultant transmitter IQMM is the complex conjugate of the first iteration.

Figure 1:
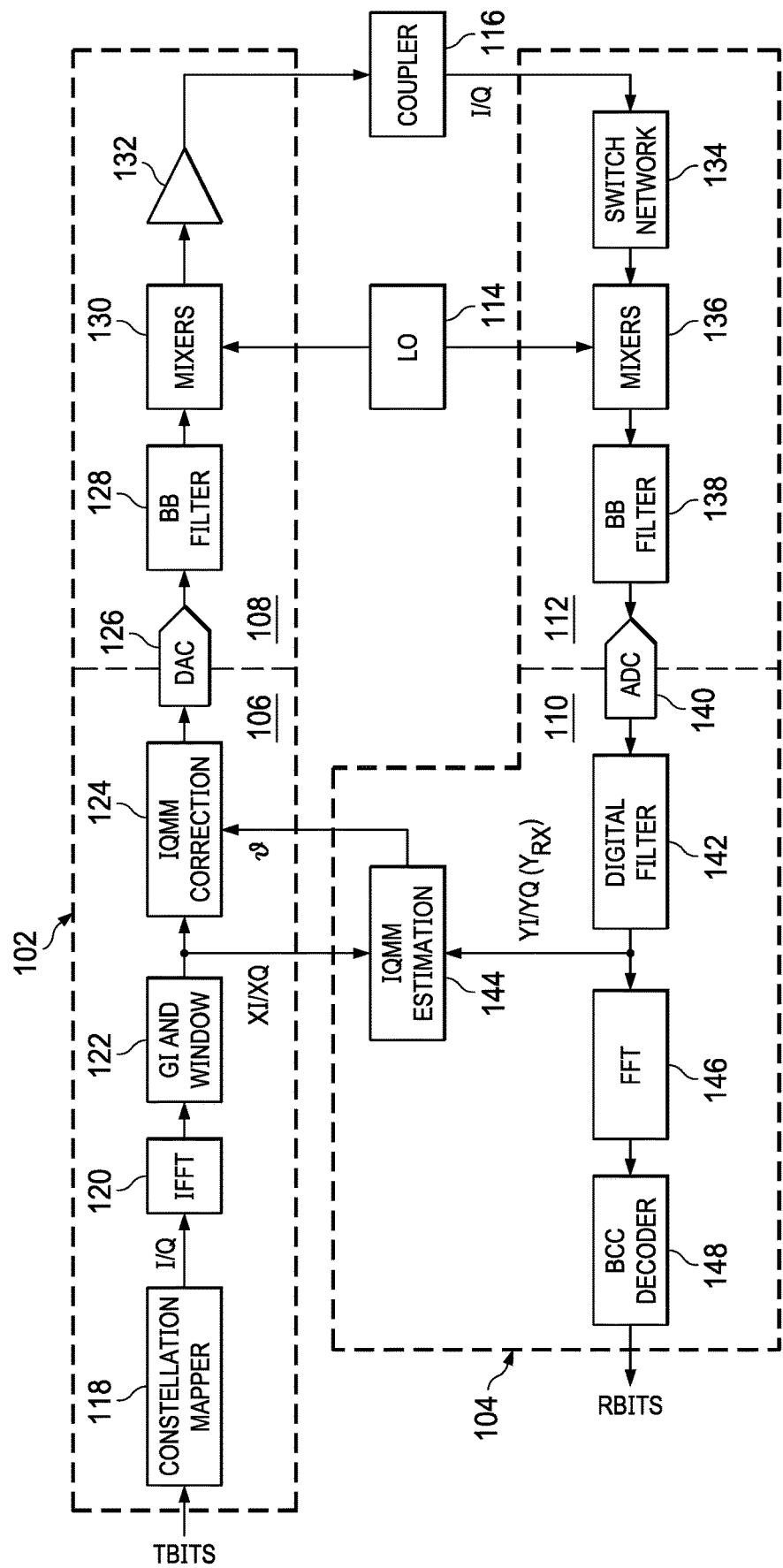
FIG. 1 is a block diagram of an example transceiver that includes symmetric and asymmetric down-conversion to estimate transmitter IQ mismatch (IQMM).

FIG. 1 is a block diagram of an example transceiver 100 that includes symmetric and asymmetric down-conversion to estimate transmitter IQMM. The transceiver 100 includes a transmitter 102, an auxiliary receiver 104, a local oscillator 114, and a coupler 116. The auxiliary receiver 104 is coupled to the transmitter 102 via the coupler 116. The auxiliary receiver 104 is used to provide feedback of signals transmitted by the transmitter 102. The transceiver 100 works on practical multi-carrier signals, i.e., signals that would be used in an operational mode, during operational data exchange between radio peers, such as using OFDM modulated signals.

The OFDM signals (e.g., OFDM data symbols) can be used to support data communication in wireless applications such as PAN networks, WLAN networks (e.g., 802.11x WiFi), WAN networks (e.g., 4G, and LTE cellular networks), WiMAX networks, mobile WiMAX networks, ADSL and VDSL networks, DVB-T and DVB-H networks, and UWB networks. The modulation schemes used can comprise, for example, Phase-Shift Keying (PSK), Amplitude Shift Keying (ASK), or Quadrature Amplitude Modulation (QAM).

The transceiver 100 includes transmitter digital circuitry 106 and transmitter analog circuitry 108. The transmitter digital circuitry 106 includes a constellation mapper 118, an Inverse Fast Fourier transform (IFFT) circuit 120, a guard interval (GI) and window circuit 122, and an IQMM correction circuit IQMM correction circuit 124, and a digital-to-analog converter (DAC) 126. The transmitter analog circuitry 108 includes a baseband filter 128, mixers 130, and a power amplifier 132.

The constellation mapper 118 receives a digital signal, shown as TBITS, (e.g., received from a processor) and generates therefrom a modulated I signal and a modulated Q signal for processing in parallel I and Q paths. The constellation mapper 118 can employ a constellation table to map each vector into a transmission symbol that is a member of one or more preselected symbol alphabets which themselves can correspond with a symbol constellation. The IFFT circuit 120 implements an inverse Fourier transform that converts the frequency domain signals received from the constellation mapper 118 into time-domain I and Q signals. The GI and window circuit 122 and the IQMM correction circuit 124 process the time domain signals received from the IFFT circuit 120.

The GI and window circuit 122 performs two tasks. The GI and window circuit 122 inserts a guard interval which prevents inter-symbol interference due to the multipath channel. The GI and window circuit 122 also employs windowing by generating a gradual amplitude rise and fall in the symbol boundaries in order to reduce energy at the out of band frequencies.

The IFFT circuit 120 can further include an Orthogonal Frequency-Division Multiple Access (OFDMA) module, where the OFDMA module maps different modulated streams to different subcarrier groups before IFFT processing. In some implementations, the IFFT circuit 120 may perform an IFFT on outputs of the constellation mapper 118 to generate one or more time-domain signals associated with one or more frequency ranges. In some implementations, the IFFT circuit 120 can be configured to use one or more FFT bandwidth frequencies such as 20 MHz, 40 MHz, 80 MHz, or 160 MHz. In some implementations, the IFFT circuit 120 may perform different IFFTs on the modulated data streams according to different FFT bandwidths.

An output of the IQMM correction circuit 124 is coupled to the DAC 126 which is coupled to the baseband filter 128. The DAC 126 and baseband filter 128 convert the time-domain signal received from the IQMM correction circuit 124 to an analog signal and shape the analog signal for transmission. The IQMM correction circuit 124 is shown receiving a digital time-domain complex representation of an IQMM of the transmitter 102 (shown as $\vartheta$) from the IQMM estimation circuit 144. Estimation of transmitter IQMM is explained herein. The IQMM estimation circuit 144 receives I and Q time-domain signals shown as YI and YQ from the output of the digital filter 142 in the auxiliary receiver 104 and time-domain I and Q signals shown as XI and XQ from the output of the GI and window circuit 122 in the transmitter 102, and computes an estimate of the IQMM of the transmitter 102. Accordingly, disclosed estimation and compensation of the IQMM of the transmitter 102 are performed in the time domain, rather than in the frequency domain.

The IQMM for the entire transmitter-auxiliary receiver loop (including the transmitter 102 and the auxiliary receiver 104) may be estimated as:

$$\hat{\vartheta} \cong \frac{\sum_{n=1}^{N} x_n \cdot y_{RX_n}}{\sum_{n=1}^{N} x_n^* \cdot y_{RX_n}} + \frac{\sum_{n=1}^{N} x_n^2}{\sum_{n=1}^{N} |x_n|^2} \quad (1)$$

where:
$\vartheta$ is the IQMM for the entire transmitter-auxiliary receiver loop;
x is the transmitter baseband signal before impairment and correction;
$x_n$ is the nth sample of x,
N is packet length;
$y_{RX}$ is the transmitted signal with IQMM impairment, received and down-converted to baseband; and
$y_{RX_n}$ is the nth sample of $y_{RX}$.

In the transceiver 100, rather than the IQMM of the entire transmitter-auxiliary receiver loop, the IQMM estimation circuit 144 estimates the IQMM of the transmitter 102, and passes the IQMM of the transmitter 102 to the IQMM correction circuit 124 for use in IQMM correction. Symmetric and asymmetric down-conversion are used to extract transmitter IQMM from transmitter-auxiliary receiver loop IQMM as hereinafter described. Thus, in the transceiver 100, the IQMM compensation applied to transmitted signal is not subject to IQMM of the auxiliary receiver 104.

The estimation of the IQMM provided by the IQMM estimation circuit 144 and the correction of the IQMM performed by the IQMM correction circuit 124 can be implemented in either hardware HW or in firmware FW (software). In a HW implementation, a Field Programmable Gate Array (FPGA) or an application specific IC (ASIC) can be used. In a FW implementation, a processor (e.g., a digital signal processor) executing instructions stored as FW can be used.

The baseband filter 128 is coupled to the mixers 130. The mixers 130 include up-converting mixers for the I and Q paths. The mixers 130 receive 90 degree shifted local oscillator signals from the local oscillator 114 and mix these local oscillator signals with the I and Q signals received from the baseband filter 128. The local oscillator 114 may provide a frequency that is identical to, or very close to, the carrier frequency of the intended transmitter output signal. The up conversion up-converts the analog signals to corresponding frequency bands for transmission.

The local oscillator 114 may include a phase lock loop (PLL). The up-converted signals generated by the mixers 130 are combined (e.g., summed) and provided to the power amplifier 132. The power amplifier 132 may include a low noise amplifier, and an output of the power amplifier 132 may be adapted to be coupled to an antenna (not shown).

The coupler 116 is between the transmitter 102 and the auxiliary receiver 104, and loops back the signal from the output of the power amplifier 132 into the I and Q paths of the auxiliary receiver 104. Like the transmitter 102, the auxiliary receiver 104 processes the I and Q signals in parallel I and Q paths. The coupler 116 is an analog component that has some signal attenuation generally comprising a linear passive component that attenuates the signal, which may or may not add a phase to the signal. For example, the coupler 116 may include an RF capacitor, or a resistor.

The auxiliary receiver 104 receives, via the coupler 116, the RF signals transmitted by the transmitter 102. For example, the received signals may include a group of OFDM sub-carriers. The auxiliary receiver 104 includes digital circuitry 110 and analog circuitry 112. The analog circuitry 112 includes a switch network 134, mixers 136, a baseband filter 138, and an analog-to-digital converter (ADC) 140. The digital circuitry 110 includes a digital filter 142, an FFT circuit 146, a BCC decoder 148, and the IQMM estimation circuit 144. The various components of the digital circuitry 110 and analog circuitry 112 may be provided for both I and Q processing paths. For example, the switch network 134 may provide separate switching circuits for the I path and the Q path, the mixers 136 may include separate mixing circuits for the I path and the Q path, etc.

The switch network 134 is coupled to the coupler 116 and receives the I and Q signals looped back from the transmitter 102. The switch network 134 includes switches that connect differential I and Q signals received from the coupler 116 to the mixers 136. The switches of the switch network 134 may be set to pass received signal so as to perform a symmetric down-conversion in the mixers 136, or may be set to pass received signal so as to perform an asymmetric down-conversion in the mixers 136. In the transceiver 100, symmetric and asymmetric down-conversion are iteratively performed on received signal, and results of the symmetric and asymmetric down-conversions are processed to estimate the IQMM of the transmitter 102.

The mixers 136 mix 90 degree shifted local oscillator signals received from the local oscillator 114 with the I and Q signals received from the switch network 134 to down-convert the I and Q signals. The baseband filter 138 and ADC 140 filter the down-converted signal and transform the signal into a digital data sequence. The ADC 140 is coupled to the digital filter 142. The FFT circuit 146 converts the time domain I and Q signals received from the digital filter 142 to frequency domain signals. The BCC decoder 148 outputs a decoded a bit stream.

Figure 2:
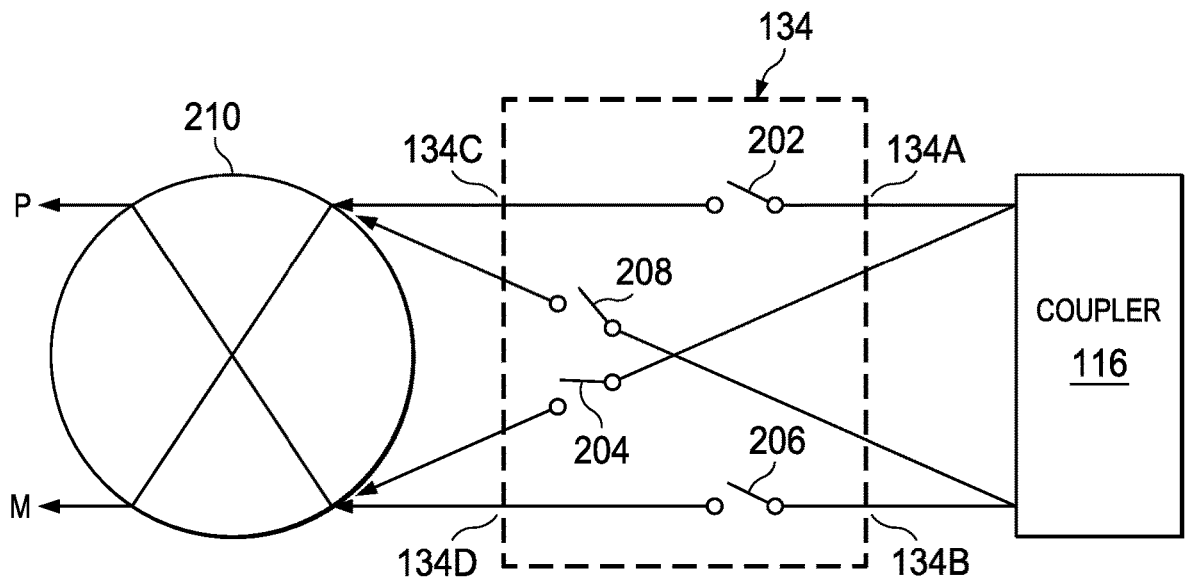
FIG. 2 is a block diagram for a portion of an example auxiliary receiver that includes a switch network for use in symmetric and asymmetric down conversion.

FIG. 2 is a block diagram for a portion of the auxiliary receiver 104 that includes the switch network 134. The switch network 134 includes inputs 134A and 134B coupled to the coupler 116. Outputs 134C and 134D of the switch network 134 are coupled to the mixers 136. In FIG. 2, a mixer 210 of the mixers 136 is shown for reference. The switch network 134 includes a switch 202, a switch 204, a switch 206, and a switch 208. A first terminal of the 202 is coupled to the 134A, and a second terminal of the 202 is coupled to the 134C. A first terminal of the 204 is coupled to the 134A, and a second terminal of the 204 is coupled to the 134D. A first terminal of the 206 is coupled to the 134B, and a second terminal of the 206 is coupled to the 134D. A first terminal of the 208 is coupled to the 134B, and a second terminal of the 208 is coupled to the 134C. The outputs of the coupler 116 form differential pairs carrying I and Q signals. The switch network 134 passes the signals to the mixer 210 for down-conversion. The switch network 134 may be configured to swap the signals of the differential pair to perform an asymmetric down-conversion in the mixer 210. The switch network 134 may be configured to pass the signals of the differential pair (without swapping) to perform a symmetric down-conversion. More specifically, switch 202 and switch 206 are closed, and switch 204 and 208 are open, to perform a symmetric down-conversion in the mixer 210. Switch 204 and switch 208 are closed, and switch 202 and 206 are open, to perform an asymmetric down-conversion in the mixer 210.

Figure 3:
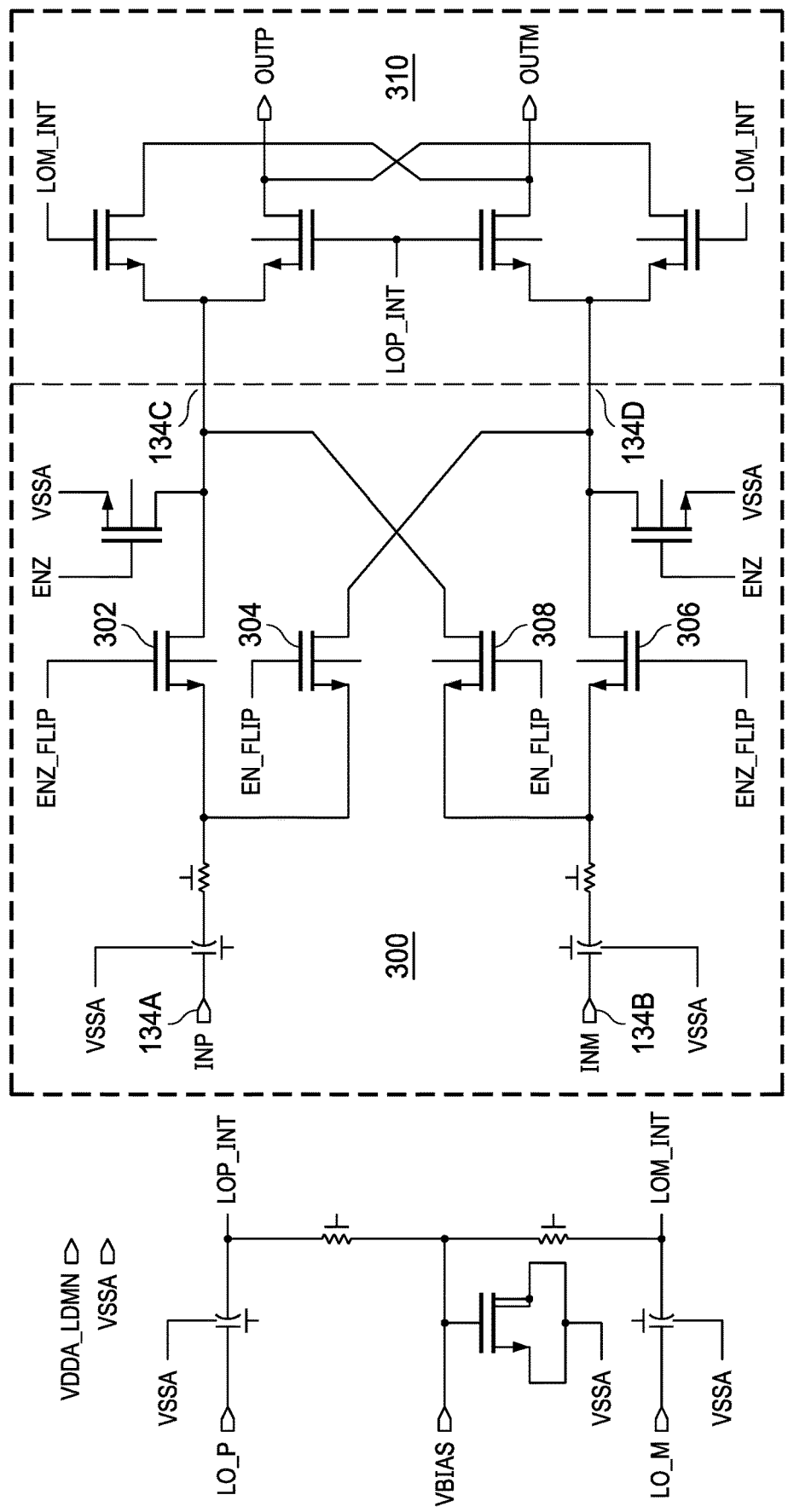
FIG. 3 is a schematic diagram for an example switch network suitable for use in symmetric and asymmetric down-conversion.

FIG. 3 is a schematic diagram for an example switch network 300 suitable for use in symmetric and asymmetric down-conversion. The switch network 300 is an implementation of the switch network 134. The switch network 300 is coupled to a mixer 310. The mixer 310 is an implementation of the mixer 210. The switch network 300 includes a transistor 302, a transistor 304, a transistor 306, and a transistor 308. The transistor 302 corresponds to the switch 202 of the switch network 134. The transistor 304 corresponds to the switch 204 of the switch network 134. The transistor 306 corresponds to the switch 206 of the switch network 134. The transistor 308 corresponds to the switch 208 of the switch network 134. To execute symmetric down-conversion, the transistor 302 and the transistor 306 are turned on, and the transistor 304 and the transistor 308 are turned off. To execute asymmetric down-conversion, the transistor 304 and the transistor 308 a turned on, and the transistor 302 and the transistor 306 are turned off.

Figure 4:
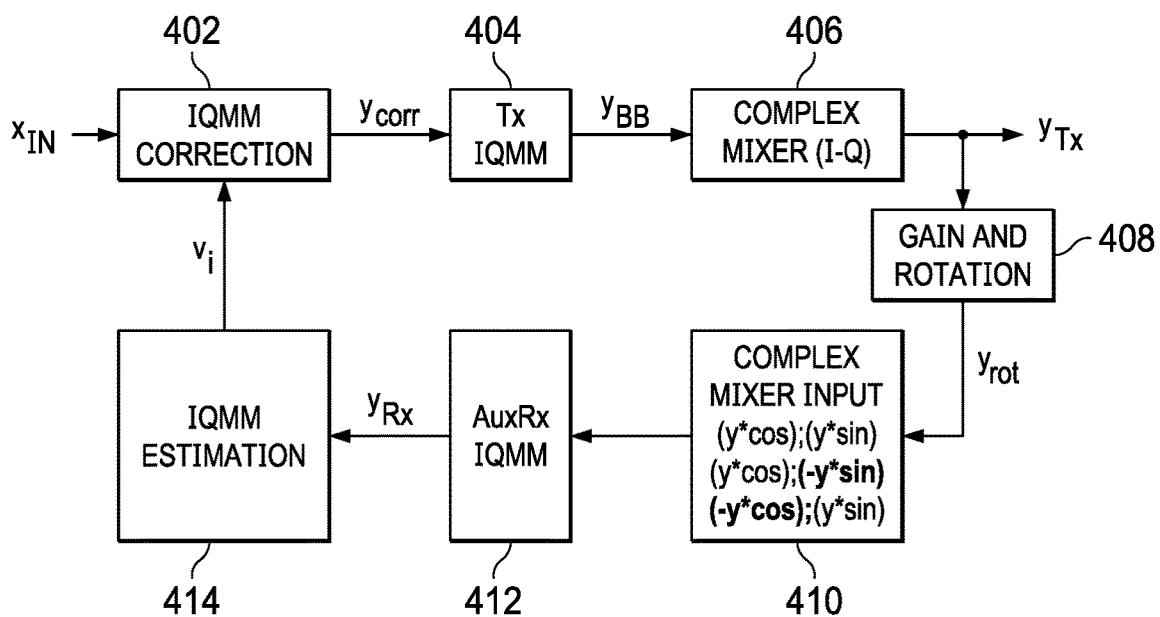
FIG. 4 illustrates various data modification operations in the transceiver of FIG. 1.

FIG. 4 illustrates various data modification operations in the transmitter-auxiliary receiver loop of the transceiver 100. Data to be transmitted ($x_{IN}$) is provided to the IQMM correction block 402. The IQMM correction block 402 corresponds to the IQMM correction circuit 124. IQMM corrected output ($y_{corr}$) of the IQMM correction block 402 is impaired by transmitter IQMM represented by Tx IQMM block 404, which may represent non-ideality in any of the DAC 126, the baseband filter 128, the mixers 130, and/or the power amplifier 132. The IQMM impaired transmit data is labeled $y_{BB}$. $y_{BB}$ is up-converted in the complex mixer block 406 to produce the transmit signal $y_{TX}$. Gain and/or rotation are applied to the I and Q signals $y_{TX}$, as represented by the gain and rotation block 408, to produce signal $y_{rot}$. The gain and rotation may result from difference in trace length, component delay/attenuation, etc. in the clock paths from the local oscillator 114 to the mixers 136 for the I and Q paths. For example, while the same oscillator signal is provided to I and Q path mixers, differences in routing of the clock signals may introduce difference in gain or rotation in the down-conversion.

In the complex mixer input block 410, the signals of the differential pairs carrying I and Q signals of $y_{rot}$ are switched in the switch network 134 to produce the inputs to the mixers 136. In the complex mixer input block 410, signal for symmetric down-conversion is represented as (y*cos); (y*sin). Signal for asymmetric down-conversion is represented as: (y*cos);(−y*sin) or (−y*cos);(y*sin), where −y represents inversion of the I or Q signal by swapping signals of the differential pair in the switch network 134. IQMM impairment in the auxiliary receiver 104 is represented by the AuxRx IQMM block 412, and the loop back data impaired by the auxiliary receiver 104 is labeled $y_{RX}$. The IQ estimation block 414, which corresponds to the IQMM estimation circuit 144 of the auxiliary receiver 104, estimates IQMM of the transmitter-auxiliary receiver and IQMM of the transmitter as $v_i$. $v_i$ is provided to the IQMM correction block 402 for use in compensating for the Tx IQMM block 404.

With reference to FIG. 4, ideal $y_{BB}$ may be represented by:

$$y_{BB} = \text{Re}\{x\} + j \cdot \text{Im}\{x\} \tag{2}$$

In reality, with IQMM uncorrected, the baseband signal $y_{BB}$ is corrupted into:

$$y_{BB} = \text{Re}\{x\} \cdot \alpha e^{j\varnothing} + j \cdot \text{Im}\{x\} \tag{3}$$

Formulation:

$$y_{BB} = ae^{j\phi} \cdot \frac{[x+x^*]}{2} + \frac{[x-x^*]}{2} \tag{4}$$

$$y_{BB} = x\frac{[ae^{j\phi}+1]}{2} + x^*\frac{[ae^{j\phi}-1]}{2} \tag{5}$$

$$y_{BB} \triangleq \alpha x + \beta x^* \tag{6}$$

The RF signal $y_{TX}$ may be represented by:

$$y_{TX}(t) = \text{Re}\{y_{BB} \cdot e^{j\omega_c t}\} \tag{7}$$

Tx IQMM can be estimated as:

$$v = \frac{\beta}{\alpha} \tag{8}$$

Estimation of v (IQMM) through the transmitter-auxiliary receiver loop (with symmetric down-conversion) may be expressed as (assuming transmitter-auxiliary receiver gain (A) & rotation(θ)):

$$G = Ae^{j\theta} \tag{9}$$

$$y_{rot} = y_{Tx} \cdot G \tag{10}$$

The auxiliary receiver input signal may be represented by:

$$y_{Rx} = y_{rot} \cdot \alpha_{Rx} + y_{rot}^* \cdot \beta_{Rx} \tag{11}$$

$v_{loop}$ (IQMM of the transmitter-auxiliary receiver loop) may be represented by:

$$y_{Rx} = \alpha_{RX}(\alpha_{TX}x + \beta_{TX}x^*)e^{j\theta} + \beta_{RX}(\alpha_{TX}x^* + \beta_{TX}^*x)e^{-j\theta} \tag{12}$$

$$y_{Rx} = (\alpha_{RX}\alpha_{TX}e^{j\theta} + \beta_{RX}\beta_{TX}^*e^{-j\theta})x + (\alpha_{RX}\beta_{TX}e^{j\theta} + \beta_{RX}\alpha_{TX}^*e^{-j\theta})x^* \tag{13}$$

$$v_{loop} = \frac{(\alpha_{RX}\beta_{TX}e^{j\theta} + \beta_{RX}\alpha_{TX}^*e^{-j\theta})}{(\alpha_{RX}\alpha_{TX}e^{j\theta} + \beta_{RX}\beta_{TX}^*e^{-j\theta})} \tag{14}$$

As $\beta_{Rx}\beta_{TX}^* \ll \alpha_{RX}\alpha_{TX}$:

$$v_{loop} = \frac{(\alpha_{RX}\beta_{TX}e^{j\theta} + \beta_{RX}\alpha_{TX}^*e^{-j\theta})}{(\alpha_{RX}\alpha_{TX}e^{j\theta})} \tag{15}$$

$$v_{loop} = v_{Tx} + v_{Rx} \cdot e^{-j(2\arg(\alpha TX))} \cdot e^{-j(2\theta)} \tag{16}$$

Estimation of v through the transmitter-auxiliary receiver loop (with asymmetric down-conversion) may be expressed as (with transmitter-auxiliary receiver gain(A) & rotation (θ)):

$$G = Ae^{j\theta} \tag{17}$$

$$y_{rot} = t_{Tx}^* \cdot G \tag{18}$$

The auxiliary receiver input signal may be represented by:

$$y_{Rx} = y_{rot} \cdot \alpha_{Rx} + y_{rot}^* \cdot \beta_{Rx} \tag{19}$$

$v_{loop}$ may be represented by:

$$y_{Rx} = \alpha_{RX}(\alpha_{TX}^* + \beta_{TX}^*x^*)e^{j\theta}\beta_{RX}(\alpha_{TX}x^* + \beta_{TX}x)e^{-j\theta} \tag{20}$$

$$y_{Rx} = (\alpha_{RX}\alpha_{TX}^*e^{j\theta} + \beta_{RX}\beta_{TX}e^{-j\theta})x + (\alpha_{RX}\beta_{TX}^*e^{j\theta} + \beta_{RX}\alpha_{TX}e^{-j\theta})x^* \tag{21}$$

$$v_{loop} = \frac{(\alpha_{RX}\beta_{TX}^*e^{j\theta} + \beta_{RX}\alpha_{TX}e^{-j\theta})}{(\alpha_{RX}\alpha_{TX}^*e^{j\theta} + \beta_{RX}\beta_{TX}e^{-j\theta})} \tag{22}$$

As $\beta_{RX}\beta_{TX}^* \ll \alpha_{RX}\alpha_{TX}$:

$$v_{loop} = \frac{(\alpha_{RX}\beta_{TX}^*e^{j\theta} + \beta_{RX}\alpha_{TX}e^{-j\theta})}{(\alpha_{RX}\alpha_{TX}^*e^{j\theta})} \tag{23}$$

$$v_{loop-2} = v_{Tx}^* + v_{Rx} \cdot e^{j(2\arg(\alpha TX))} \cdot e^{-j(2\theta)} \tag{24}$$

To compute transmitter IQMM:
Final Computation-1
Consider the 2 v IQMM estimations using symmetric and asymmetric down-conversions:

$$v_1 = v_{Tx} + v_{Rx} \cdot e^{-j(2\arg(\alpha TX))} \cdot e^{-j(2\theta)} \tag{25}$$

$$v_2 = v_{Tx}^* + v_{Rx} \cdot e^{j(2\arg(\alpha TX))} \cdot e^{-j(2\theta)} \tag{26}$$

Consider $t_1$ $$t_1 = \frac{v_1 - v_2^*}{2} \tag{27}$$

$$t_1 = e^{-j(2\arg(\alpha TX))} \cdot j \cdot Im(v_{Rx} \cdot e^{-j(2\theta)}) \tag{28}$$

$$\arg(\alpha_{TX}) = \frac{\left(\frac{\pi}{2} - \arg(t_1)\right)}{2} \tag{29}$$

Consider $t_2$ $$t_2 = e^{-j(2\arg(\alpha TX))} \tag{30}$$

$$v_1 \cdot t_2^* = v_{Tx} \cdot t_2^* + v_{Rx} \cdot t_2 t_2^* \cdot e^{-j(2\theta)} \tag{31}$$

$$v_2 \cdot t_2 = v_{Tx}^* \cdot t_2 + v_{Rx} \cdot t_2^* \cdot t_2 \cdot e^{-j(2\theta)} \tag{32}$$

Consider $t_3$ $$t_3 = v_1 \cdot t_2^* - v_2 \cdot t_2 \tag{33}$$

$$t_3 = v_{Tx} \cdot t_2^* - v_{Tx}^* \cdot t_2 \tag{34}$$

Note: $t_3$ is a pure imaginary number.

Final Computation-2

$$v_{Tx} = \frac{\beta_{Tx}}{\alpha_{Tx}}, \text{ and} \tag{35}$$

$$\beta_{Tx} = \alpha_{Tx} - 1 \tag{36}$$

Thus, $$t_3 = \left(\frac{\alpha_{Tx}-1}{\alpha_{Tx}}\right) t_2^* - \left(\frac{\alpha_{TX}^*-1}{\alpha_{TX}^*}\right) t_2 \tag{37}$$

$$t_3 = (t_2^* - t_2) - \left(\frac{\alpha_{TX}^* t_2^* - \alpha_{Tx} t_2}{\alpha_{Tx} \alpha_{TX}^*}\right) \tag{38}$$

$$\left(\frac{\alpha_{Tx} t_2 - \alpha_{TX}^* t_2^*}{\alpha_{Tx} \alpha_{TX}^*}\right) = 2j \cdot \sin(2\arg(\alpha_{Tx})) - t_3 \tag{39}$$

Now, $$\alpha_{Tx} = |\alpha_{Tx}| \cdot e^{j\arg(\alpha_{Tx})} \tag{40}$$

Consider $t_4$ $$t_4 = 2j \cdot \sin(2\arg(\alpha_{Tx})) - t_3 \tag{41}$$

$$\left(\frac{|\alpha_{Tx}| \cdot e^{j\arg(\alpha_{Tx})} \cdot e^{-j(2\arg(\alpha_{TX}))} - |\alpha_{Tx}| e^{-j\arg(\alpha_{Tx})} \cdot e^{j(2\arg(\alpha_{TX}))}}{|\alpha_{Tx}|^2}\right) = t_4 \tag{42}$$

Final Computation-3

$$\left(\frac{e^{-j\arg(\alpha_{TX})} - e^{j\arg(\alpha_{Tx})}}{|\alpha_{Tx}|}\right) = t_4 \tag{43}$$

$$|\alpha_{Tx}| = \frac{-2j \cdot \sin(\arg(\alpha_{Tx}))}{t_4} \tag{44}$$

Finally, with both $|\alpha_{Tx}|$ and $\arg(\alpha_{Tx})$, $v_{Tx}$ (transmitter IQMM) can be determined.

$$v_{Tx} = \frac{\alpha_{Tx} - 1}{\alpha_{Tx}} \tag{45}$$

This transmitter IQMM can then be applied by the IQMM correction block 402 to cancel out the IQMM applied as a consequence of Tx IQMM 404 so that the corrected $y_{BB}$ is at or near the ideal of equation (2).

Figure 5:
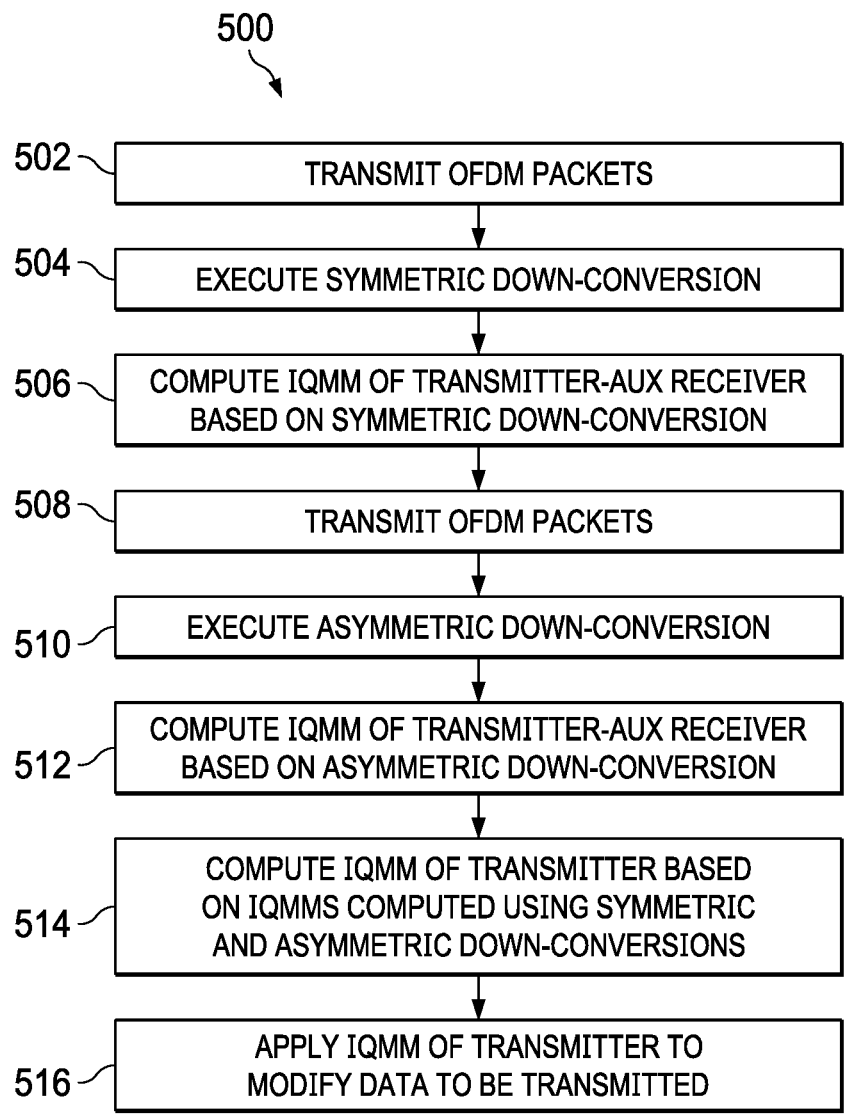
FIG. 5 is a flow diagram for a method for transmitter IQMM correction that includes transmitter IQMM estimation based on symmetric and asymmetric down conversion.

FIG. 5 is a flow diagram for a method 500 for transmitter IQMM correction that includes transmitter IQMM estimation based on symmetric and asymmetric down conversion. Though depicted sequentially as a matter of convenience, at least some of the actions shown can be performed in a different order and/or performed in parallel. Additionally, some implementations may perform only some of the actions shown. Operations of the method 500 may be performed by the transceiver 100. Computations of the method 400 may be executed by hardware of the IQMM estimation circuit 144 and/or firmware executed by a processor of the IQMM estimation circuit 144.

In block 502, the transmitter 102 transmits one or more OFDM packets in the course of normal operation. The transmission of the OFDM packets may include applying some amount of IQMM correction. In early operation, the IQMM correction applied to the OFDM packets may be set to zero or a default value. The OFDM packets are looped back to the auxiliary receiver 104 via the coupler 116.

In block 504, the auxiliary receiver 104 is configured for symmetric down-conversion. For both I and Q signals, the switch network 134 is configured to a pass the signals of the differential pairs carrying the OFDM packets without swapping (i.e., without inversion). In the switch network 134 (for both I and Q signals), the switch 202 and the switch 206 are closed, and the switch 204 and the switch 208 are open. The mixers 136 down-convert the signal received from the switch network 134. The down-converted signal is filtered by the baseband filter 138, digitized by the ADC 140, and further filtered by the digital filter 142.

In block 506, the IQMM estimation circuit 144 computes the IQMM of the transmitter 102 and the auxiliary receiver 104 based on the symmetrically down-converted OFDM packets as per equations (9)-(16).

In block 508, the transmitter 102 transmits one or more OFDM packets in the course of normal operation. The OFDM packets are looped back to the auxiliary receiver 104 via the coupler 116.

In block 510, the auxiliary receiver 104 is configured for asymmetric down-conversion. For one of the I or Q signals, the switch network 134 is configured to swap the signals of the differential pair carrying the OFDM packet (i.e., pass the signals with inversion). In the switch network 134 (for one of the I or Q signals), the switch 204 and the switch 208 are closed, and the switch 202 and the switch 206 are open. The mixers 136 down-convert the signals received from the switch network 134. The down-converted signal is filtered by the baseband filter 138, digitized by the ADC 140, and further filtered by the digital filter 142.

In block 512, the IQMM estimation circuit 144 computes the IQMM of the transmitter 102 and the auxiliary receiver 104 based on the asymmetrically down-converted OFDM packets as per equations (17)-(24).

In block 514, the IQMM estimation circuit 144 computes the IQMM of the transmitter 102 (as per equations (25)-(45)) based on the IQMM of the transmitter 102 and the auxiliary receiver 104 computed with symmetric down-conversion in block 506, and the IQMM of the transmitter 102 and the auxiliary receiver 104 computed with asymmetric down-conversion in block 512. In some examples, the computed IQMM is a measure of uncorrected IQMM still present in the transmitter 102 and represents an adjustment to an IQMM correction applied during the transmission of the OFDM packets.

In block 516, the IQMM correction circuit 124 applies an IQMM correction based on the IQMM of the transmitter computed in block 414 to adjust the signal (adjust the gain and phase of the signal) to be transmitted by the transmitter 102. Applying the IQMM may include generating an inverse image signal based on the IQMM and adding the inverse image signal to the signal to be transmitted.

In block 518, the transmitter transmits the signal (e.g., another set of OFDM symbols) by applying the IQMM correction of block 516.

The transmitter and the IQMM estimation method implemented by the transmitter as described herein provide a number of advantages over other solutions. The IQMM estimation is agnostic to local oscillator leakage levels that affect amplitude modulation detector methods. Use of special calibration patterns, like continuous wave pulses, can falsely trigger radars and violate emission specifications. The IQMM estimation uses OFDM signal rather than special calibration patterns, and can therefore be implemented over operational packets without allocating time and power to non-operation transmission. The IQMM estimation operates in the time domain, with relatively small and inexpensive circuitry. In contrast, IQMM estimation in the frequency domain uses FFT circuitry that is large (e.g. over ten time larger than the time domain circuitry) and consumes substantial power. Relative to other time domain solutions, the IQMM estimation described herein is immune to auxiliary receiver IQFD.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-type metal-oxide-silicon field effect transistor ("MOSFET") may be used in place of an n-type MOSFET with little or no changes to the circuit. Furthermore, other types of transistors may be used (such as bipolar junction transistors (BJTs)).

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Modifications are possible in the described embodiments, and other embodiments are possible, within the scope of the claims.

What is claimed is:

1. A transceiver circuit, comprising:
   a transmitter including:
      an IQ mismatch (IQMM) correction circuit; and
      a power amplifier including:
         an input coupled to the IQMM correction circuit; and
         an output; and
   a receiver coupled to the output of the power amplifier, and including:
      a switch network coupled to the output of the power amplifier, and including:
         a first input, a second input, a first output, and a second output;
         a first switch coupled between the first input and the first output;
         a second switch coupled between the first input and the second output;
         a third switch coupled between the second input and the second output; and
         a fourth switch coupled between the second input and the first output;
      a mixer coupled to the first output and the second output of the switch network; and
      an IQMM estimation circuit coupled to the mixer and the IQMM correction circuit.

2. The transceiver circuit of claim 1, wherein the first switch, the second switch, the third switch, and the fourth switch are coupled such that:
   the first switch is closed, the second switch is open, the third switch is closed, and the fourth switch is open to perform a symmetric down-conversion; and
   the first switch is open, the second switch is closed, the third switch is open, and the fourth switch is closed to perform an asymmetric down-conversion.

3. The transceiver circuit of claim 2, wherein the IQMM estimation circuit is configured to compute a first IQMM estimate for the transmitter and the receiver based on the symmetric down-conversion.

4. The transceiver circuit of claim 3, wherein the IQMM estimation circuit is configured to compute a second IQMM estimate for the transmitter and the receiver based on the asymmetric down-conversion.

5. The transceiver circuit of claim 4, wherein the IQMM estimation circuit is configured to compute a transmitter IQMM estimate based on the first IQMM estimate and the second IQMM estimate.

6. The transceiver circuit of claim 5, wherein the IQMM correction circuit is configured to modify a signal to be transmitted based on the transmitter IQMM estimate.

7. The transceiver circuit of claim 1, wherein the transmitter is configured to transmit orthogonal frequency multiplexed (OFDM) packets.

8. The transceiver circuit of claim 1, wherein the receiver further includes an analog-to-digital converter coupled between the mixer and the IQMM estimation circuit.

9. The transceiver circuit of claim 8, wherein the receiver further includes a baseband filter coupled between the mixer and the analog-to-digital converter.

10. The transceiver circuit of claim 1, wherein the transmitter further includes a guard interval and window circuit including an output, wherein the IQMM correction circuit includes an input coupled to the output of the guard interval and window circuit.

11. The transceiver circuit of claim 10, wherein the IQMM estimation circuit includes an input coupled to the output of the guard interval and window circuit.

12. The transceiver circuit of claim 1, wherein the transmitter further includes a digital-to-analog converter coupled between the IQMM correction circuit and the power amplifier.

13. A transceiver circuit comprising:
   a transmitter including:
      an IQ mismatch (IQMM) correction circuit including an input and an output;
      a digital-to-analog converter (DAC) including an input coupled to the output of the IQMM correction circuit, wherein the DAC further includes an output; and
      a power amplifier including an input coupled to the output of the IQMM correction circuit, wherein the power amplifier further includes an output;
   a coupler including an input coupled to the output of the power amplifier, wherein the coupler further includes an output; and
   a receiver coupled to the output of the coupler, wherein the receiver further includes:
      a switch network coupled to the output of the coupler, wherein the switch network further includes:
         a first input, a second input, a first output, and a second output;
         a first switch coupled between the first input and the first output;
         a second switch coupled between the first input and the second output;
         a third switch coupled between the second input and the second output; and
         a fourth switch coupled between the second input and the first output;
      a mixer coupled to the first output and the second output of the switch network, wherein the mixer further includes an output;
      an analog-to-digital converter (ADC) including an input coupled to the output of the mixer, wherein the ADC further includes an output; and
      an IQMM estimation circuit including an input coupled to the output of the ADC, wherein the IQMM estimation circuit further includes output coupled to the input of the IQMM correction circuit.

14. The transceiver circuit of claim 13,
wherein the receiver further includes a baseband filter including an input coupled to the output of the mixer, and
wherein the baseband filter further includes an output to the input of the ADC.

* * * * *